Oct. 24, 1939.  J. P. CREWS  2,177,171

COOKING UTENSIL

Filed Nov. 12, 1937

J. P. Crews
INVENTOR.

BY C.A.Snow&Co.

ATTORNEYS.

Patented Oct. 24, 1939

2,177,171

UNITED STATES PATENT OFFICE 2,177,171

COOKING UTENSIL

Joseph P. Crews, Terrell, Tex.

Application November 12, 1937, Serial No. 174,251

1 Claim. (Cl. 53—1)

This invention relates to cooking utensils, an object being to provide a means whereby food can be properly cooked by boiling water, the construction of the utensil being such as to prevent the water from overboiling onto the stove.

It is a further object to provide a cooking utensil which is of simple construction and the parts of which are readily assembled and taken apart.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
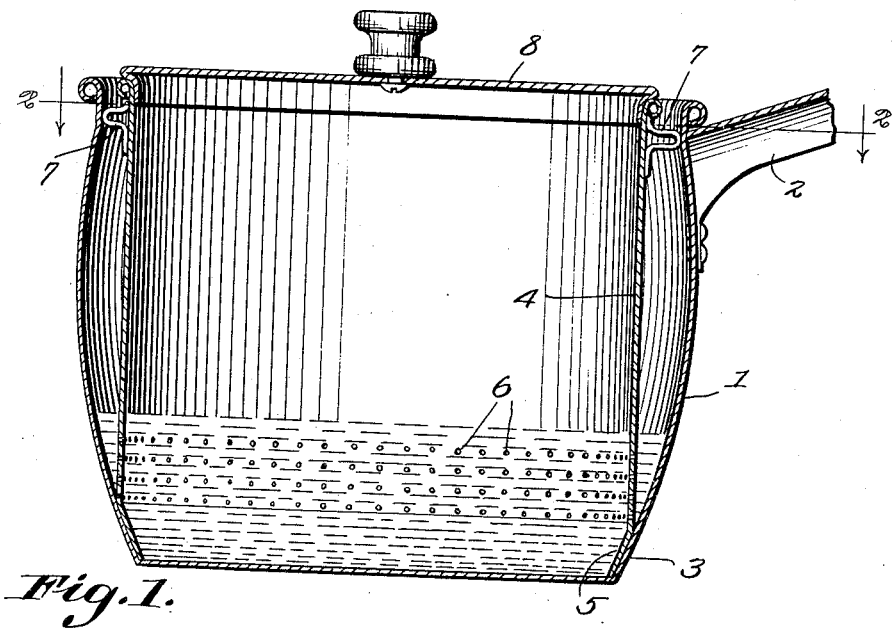
Figure 1 is a central vertical section through the utensil, the same being shown supplied with water for cooking purposes.
Figure 2:
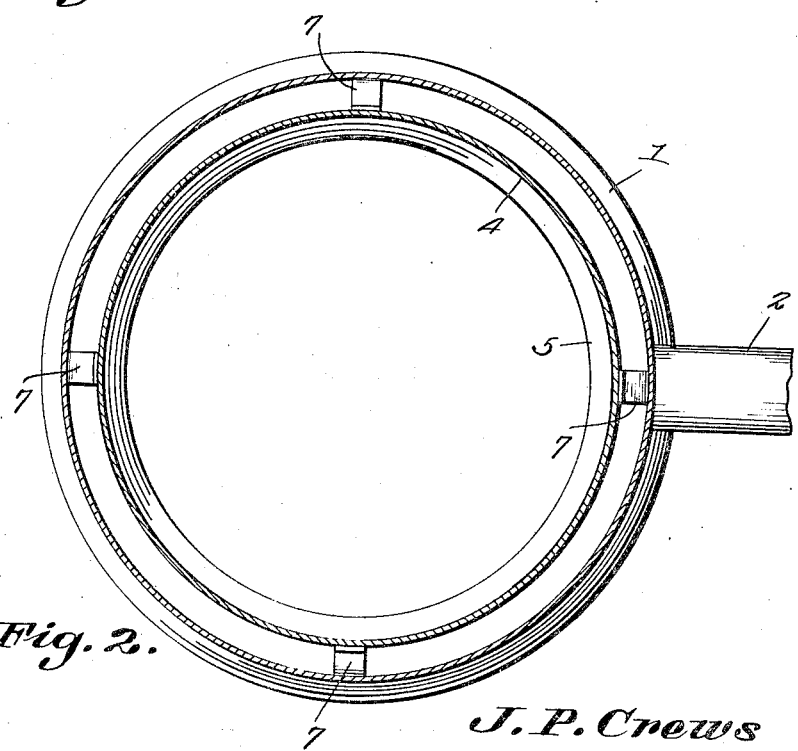
Figure 2 is a section on line 2—2, Figure 1.

The utensil comprises an outer container 1 which can be provided with a handle 2 if so desired, the bottom portion being preferably tapered downwardly as indicated at 3. Associated with this outer receptacle is an inner member or insert 4 preferably cylindrical although it can be of any shape to be properly centered within the container. This inner member is open at the top and bottom, the bottom portion being tapered, as shown at 5 so as to fit snugly against the inner surface of the tapered lower portion of the container 1. The bottom of the container serves to normally close the bottom of the inner member 4 as shown. Annular series of apertures 6 are formed in the wall of the inner member adjacent to the tapered portion 5 thereof and below the normal water-level.

The upper edge portion of the inner container is spaced annularly from the corresponding edge portion of the outer container 1 and is at or below the level thereof. The inner member has spacing lugs 7 formed on or secured to it at regular intervals so as to contact the inner surface of the walls of container 1 and thus hold the upper portion of the inner member properly centered. A lid or cover 8 is provided for the inner container and, when in position thereon, serves normally to prevent the escape of steam.

In using the utensil the inner member 4 is fitted snugly within the outer member so that the parts will assume the relative positions shown in Figure 1. The food to be cooked is placed in the inner member 4 and sufficient water is also placed in the utensil to bring the water-level to a point above the apertures 6. Lid 8 is then placed in position and the cooking operation can be proceeded with.

It is a well known fact that water within a closed container will boil more rapidly than water in an open container. Therefore when the utensil arranged as described is placed over a flame or other heating element, the water in the inner member 4 will boil so as to cook the food whereas that portion of the water surrounding the inner member and within container 1, being in an area which is open at the top and being located at points remote from the heating element, will not boil. Should the water in the inner member be boiled excessively so as to lift the lid 8, the overflow of water would be received into the open space between the container 1 and the inner member 4 and flow downwardly in said space and ultimately be returned through the apertures to the inner member. Thus all danger of the water boiling over onto the heating element is eliminated.

It has been found in practice that unless extreme heat is applied, foods may be cooked in this utensil without danger of boiling over onto the heater.

After the food has been properly cooked the inner member 4 can be lifted out, leaving the cooked food in the outer container 1 from which it subsequently can be removed.

What is claimed is:

A cooking utensil for maintaining about a body of boiling water a jacket of water which is not boiling, said utensil including an outer container open at the top, a bottomless inner member seated in the container and having a tapered lower end normally wedged detachably in the bottom portion of the container, the bottom of said member being closed by the bottom of the container, there being apertures in the inner member adjacent to the lower end thereof but above the snugly fitting portions, and a closure for the inner member at the top thereof, said inner member being spaced inwardly from the container above the snugly fitting portions to provide an annular space for holding a non-circulating jacket of water constantly exposed to the atmosphere through the top of the container, said space being in constant communication with the interior of the inner member solely through said apertures in the lower portion of said member.

JOSEPH P. CREWS.